C. T. WESTLAKE.
CAR TRUCK.
APPLICATION FILED JAN. 20, 1913.

1,079,459.

Patented Nov. 25, 1913.

Witnesses:
J. Adolph Bishop.
M. Smith

Inventor,
Charles T. Westlake,
By F. R. Cornwall, Atty

UNITED STATES PATENT OFFICE.

CHARLES T. WESTLAKE, OF ST. LOUIS, MISSOURI, ASSIGNOR TO SWING ROLLING TRUCK CO., OF ST. LOUIS, MISSOURI, A CORPORATION OF DELAWARE.

CAR-TRUCK.

1,079,459.

Specification of Letters Patent.  Patented Nov. 25, 1913.

Application filed January 20, 1913. Serial No. 743,088.

*To all whom it may concern:*

Be it known that I, CHARLES T. WESTLAKE, a citizen of the United States, residing at St. Louis, Missouri, have invented a certain new and useful Improvement in Car-Trucks, of which the following is a full, clear, and exact description, such as will enable others skilled in the art to which it appertains to make and use the same, reference being had to the accompanying drawings, forming part of this specification, in which—

Figure 1:
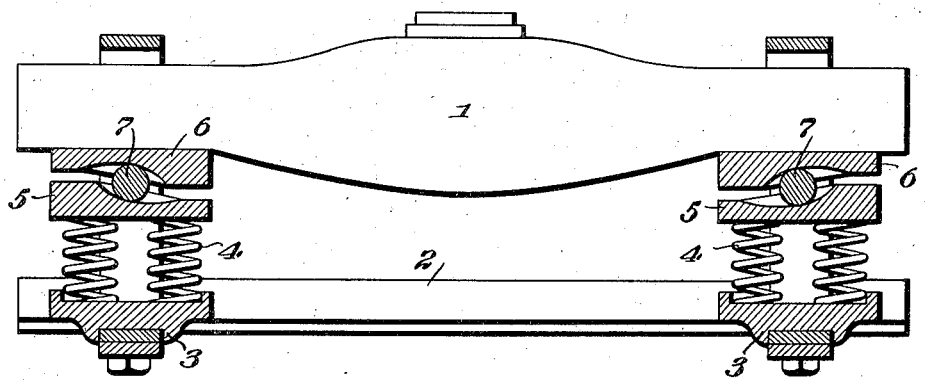
Figure 2:
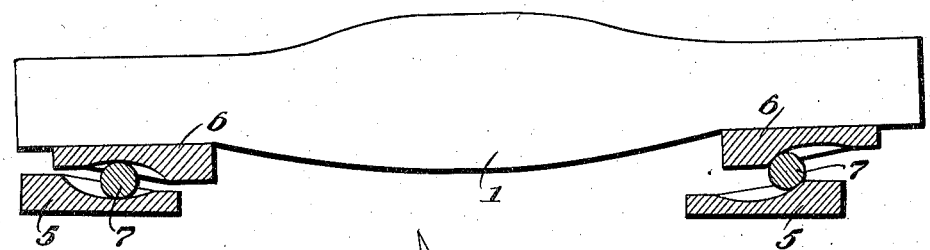
Figure 3:
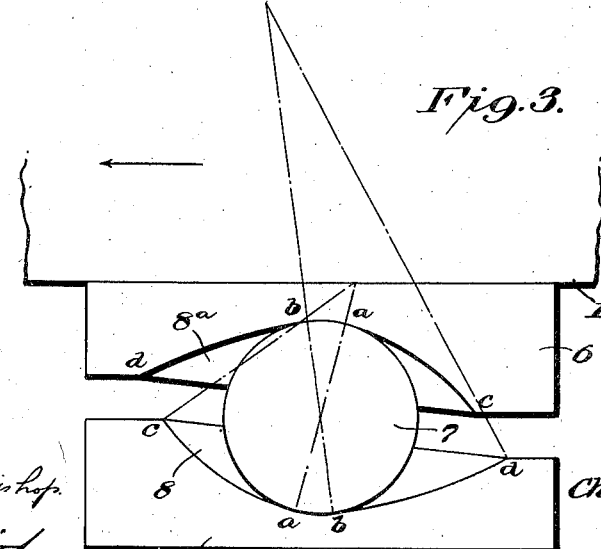

Figure 1 is a sectional view taken transversely through a car truck of my improved construction at a point adjacent to the bolster and spring plank, and showing the roller supports for the bolster as contemplated by my invention. Fig. 2 is a sectional view similar to Fig. 1, and showing the bolster and the roller supports in the positions they assume when the bolster is moved or swung laterally with respect to the truck frame. Fig. 3 is an enlarged detail sectional view of one of the roller supports, and illustrating diagrammatically the arrangement and contour of the seat or surface on which the roller bears.

My invention relates generally to improvements in railway car trucks, and more particularly to the supporting means for the end portions of the truck bolster, which supporting means, under certain conditions, permits the bolster to move or swing laterally with respect to the truck frame.

As is well known, the feature of a lateral or swing-motion car truck, and which gives it its name, is the provision therein for a certain amount of lateral swing or movement of the truck bolster relative to the truck frame, and thus, under normal conditions and upon straight track, the bolster is maintained in a substantially horizontal plane, and when turning a curve at other than a very low speed, the centrifugal force of the car body transmitted to the bolster causes the same to swing or shift laterally of the truck frame and centrifugally of the track curve. It is the usual practice in lateral or swing-motion car trucks to support the truck bolster from the truck frame by means of swing hangers, certain types of which are constructed so as to normally maintain the bolster in substantially rigid position, but which will permit said bolster to swing laterally upon the application of considerable force, and such types of trucks are in effect rigid trucks on straight track and swinging trucks at high speed on curves. It is obvious that this same action and effect can be produced by means of roller supports for the truck bolster, which roller supports operate in seats of proper contour, and it is the principal object of my invention to arrange roller supports beneath the end portions of the truck bolster, and to provide seats for the rollers, which seats have variably curved surfaces arranged so that when the bolster is shifted laterally under great force, one end thereof will be elevated, thus causing the supported car body to travel in a curved path about a point substantially above its center of gravity, and to also rotate about an imaginary axis.

A further object of my invention is to provide seats for the supporting rollers, which will tend to maintain said rollers in their normal positions and to cause the same to have a high degree of initial resistance to lateral movement of the bolster.

The feature of causing a car body to partially rotate about an imaginary axis has been found very desirable and advantageous in car construction for the reason that the greater portion of the side thrust developed when rounding curves at high speeds is absorbed or counteracted by causing the body of the car to thus rotate instead of displacing the center of gravity to the extent caused by the use of ordinary parallel swing hangers.

To the above purposes my invention consists in certain novel features of construction and arrangement of parts hereinafter more fully described and claimed.

Referring by numerals to the accompanying drawings which illustrate a simple construction and arrangement for carrying out my invention, 1 designates a truck bolster, 2 the spring plank, 3 the spring seats supported by the end portions of the spring plank, 4 the springs which rest upon the seats 3 and yieldingly support the vertically moving plates 5 in which the lower roller seats are formed.

The undersides of the end portions of the bolster 1 are preferably provided with bearing plates 6, the undersides of which are provided with roller seats which are reversely formed and arranged with respect to the seats in the plates 5. The roller supports 7 are cylindrical in form, preferably constructed of hardened metal, and are positioned between the plates 5 and 6.

Formed in the top surface of each plate 5 is a shallow pocket 8, the lowermost portion of the surface of which, or that portion from $a$ to $b$ is curved and has the same radius as the roller, and that portion of the bottom of the pocket toward the outer end of the plate 5, or that portion between $a$ and $c$ is formed on a curve having a greater radius than that of the roller. The surface of the pocket between the points $a$ and $c$ gradually curves upward from the outer end of the curved surface $a$—$b$ to the top of the plate 5. The opposite or inner portion of the bearing surface of the pocket 8, or that portion between $b$ and $d$ is formed on a curve having a much greater radius than the radius of the curved surface $a$—$c$, and this portion of the bearing surface curves gradually upward to the top of the bearing plate 5 near its inner end.

The centers for the radii on which the curved bearing surfaces are formed are diagrammatically illustrated in Fig. 3, the curves $a$—$b$ and $b$—$d$ being tangent at $b$, and curves $a$—$b$ and $a$—$c$ tangent at $a$.

Formed in the underside of the plate 6 is a pocket $8^a$, the bottom of which has the same contour as the bottom of the pocket in the plate 5, but the curve or curves on which the bottom of said pocket $8^a$ is formed are reversely arranged relative to the curves on which the bottom of the pocket 8 is formed. Thus when the plates are properly assembled the comparatively short curve $a$—$c$ on the plate 6 is positioned above the curved surface $b$—$d$ of the plate 5, and the curved surface $b$—$d$ of the plate 6 is positioned above the curved surface $a$—$c$ of the plate 5. Normally the roller 7 is positioned at a central point within the pockets 8 and $8^a$ with parts of this surface bearing against the surfaces $a$—$b$ at the deepest portions of the pockets 8 and $8^a$. As hereinbefore stated, these surfaces $a$—$b$ have the same radius as that of the roller, and thus when said roller is in its normal position and in engagement with said surfaces will maintain its seat against considerable lateral force by virtue of which the truck will be practically rigid while traveling on straight track.

When the bolster is moved laterally in the direction indicated by the arrow in Fig. 3 as a result of centrifugal force developed by the truck rounding a curve at comparatively high speed, the roller 7 will rise gradually upward on the curved surface $a$—$c$ of the plate 5 and the upper portion of said roller bearing against the corresponding curved surface $a$—$c$ of the plate 6 will cause said plate and the corresponding end of the bolster to rise quickly, and during this movement the roller beneath the opposite end of the bolster will be bearing upon the curved surfaces $b$—$d$ of the opposite pair of plates, which surfaces, as heretofore stated, have much greater radii than the surface $a$—$c$, and thus one end of the bolster will be elevated in advance of the other end, and which action causes the supported car body to be constrained to travel in a curved path and at the same time to rotate about an imaginary axis.

The action produced by roller bearings of my improved construction is practically the same as that produced by utilizing converging swing hangers having three points of pivotal connection.

By the use of rollers a considerable amount of friction is eliminated, and by forming the lowermost portions of the pockets with bearing faces having the same radius as the roller, a truck is produced which is rigid on straight track and which is in effect a swing-motion truck on curved track.

By virtue of my improved construction it is possible to maintain equilibrium of the truck under all conditions, and it is also possible for the truck to take a curve at a comparatively high degree of speed for the side thrust or centrifugal force of the load developed in rounding a curve is counteracted and absorbed by utilizing it to raise the body of the car and to cause said body to partially rotate about an imaginary axis.

It will be readily understood that minor changes in the size, form and construction of the various parts of my improved truck may be made and substituted for those herein shown and described without departing from the spirit of my invention, the scope of which is set forth in the appended claims.

I claim:

1. A car having rolling body supports of high initial resistance to lateral movement and arranged so that when the car body moves laterally from its normal position said car body is caused to also travel in a curved path and to rotate about an imaginary axis.

2. In a car truck, a bolster and supports for said bolster, which supports are arranged for rolling movement on seats so as to resist normal lateral thrust upon the bolster and to elevate one end of said bolster in advance of the other when said bolster is subjected to abnormal lateral thrust.

3. In a car truck, a bolster, rolling supports therefor, bearing members for said rolling supports, which bearing members are provided with roller bearing surfaces the central parts of which are curves having the same radius as the rolling supports, and the balance of said bearing surfaces having different radii.

4. In a car truck, a bolster, rolling supports therefor, supporting members having curved bearing faces for the rolling supports, the outer portion of each curved bearing surface having a shorter radius than the inner portion of said curved bearing surface.

5. In a car truck, a bolster, rolling supports therefor, supporting means having bearing faces for said rolling supports, which bearing faces are formed so as to maintain the rolling supports in normal positions against normal lateral thrust of the car body transmitted to the bolster, and to elevate one end of the bolster in advance of the other when abnormal side thrust of the car body is transmitted to the bolster, and to cause said car body to travel in a curved path and to rotate about an imaginary axis.

6. In a car truck, a bolster, rolling supports therefor, supporting means for the rolling supports, and which supporting means is provided with rolling support bearing faces parts of which are differentially curved so as to offer increasing resistance to all lateral thrust imparted to the bolster.

7. In a car truck, a bolster, rolling supports therefor, supporting means for said rolling supports, which supporting means is provided with bearing faces for the rolling supports each of which bearing faces is formed with a series of curves having different radii.

8. In a car truck, a bolster, rolling supports therefor, supporting means for the rolling supports, which supporting means is provided with bearing faces for the rolling supports, the central portion of each bearing having the same radius as the surface of the rolling support, and the adjacent portions of which bearing surface are curved in opposite directions to different radii.

9. A car having rolling body supports and seats for said rolling supports, parts of which seats are differentially curved lengthwise.

10. A car having rolling body supports and a pair of differentially curved seats for each rolling support, which seats are reversely disposed with respect to each other.

11. A car having rolling body supports, differentially curved seats for said supports, which seats are arranged to cause the car body to travel in a curved path and to also partially rotate about an imaginary axis when said body is shifted laterally.

In testimony whereof I hereunto affix my signature in the presence of two witnesses, this 14th day of January, 1913.

CHARLES T. WESTLAKE.

Witnesses:
HAL C. BELLVILLE,
FRED H. BLANKENHORN.